(No Model.)
W. W. LEONARD.
VEHICLE DEVICE FOR CHECKING HORSES.
No. 320,262. Patented June 16, 1885.
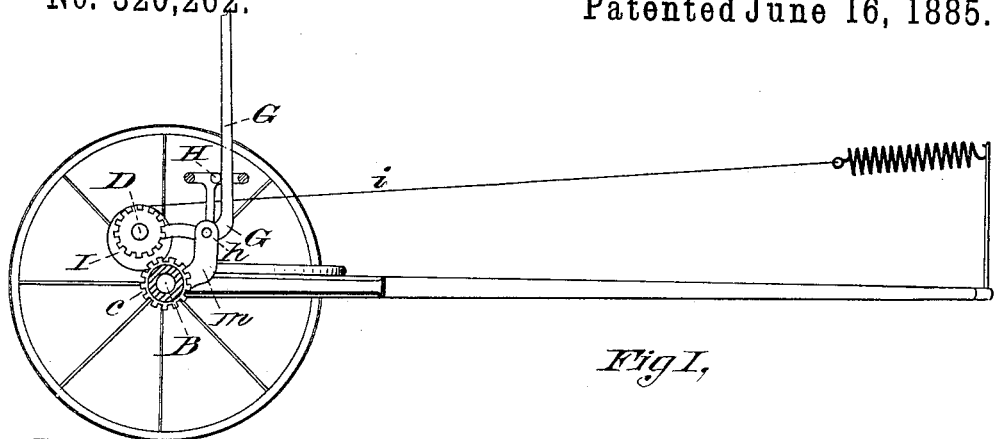
Fig. I.
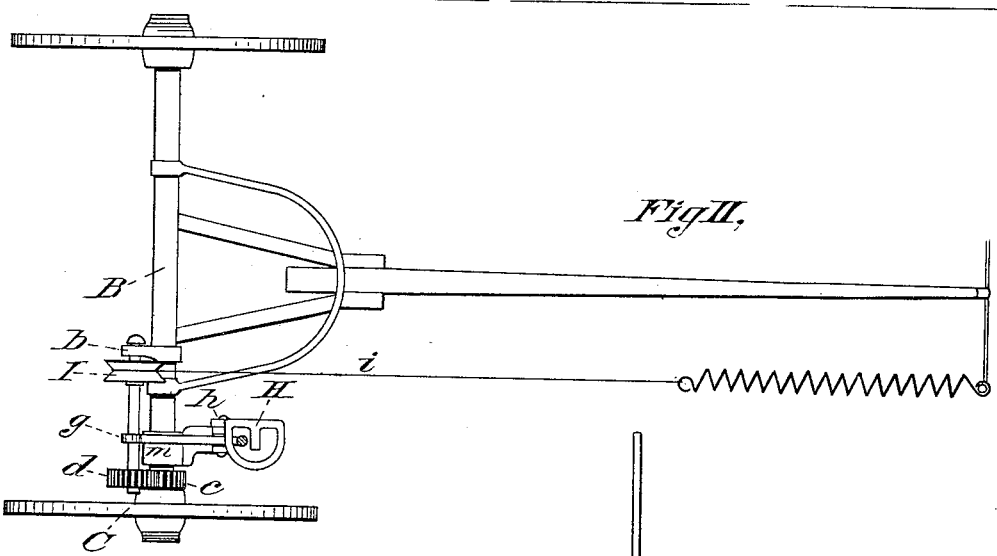
Fig. II.
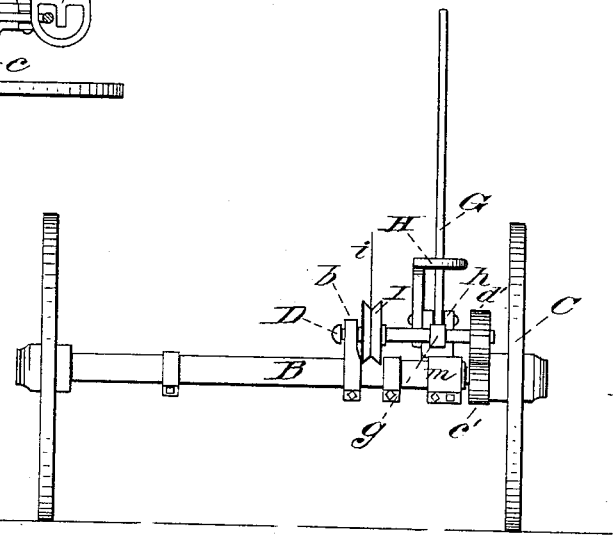
Fig. III.
Witnesses,
Inventor,
W. W. Leonard
by R. F. Hyde.
Atty.

UNITED STATES PATENT OFFICE.

WILLIAM W. LEONARD, OF SPRINGFIELD, MASSACHUSETTS.

VEHICLE DEVICE FOR CHECKING HORSES.

SPECIFICATION forming part of Letters Patent No. 320,262, dated June 16, 1885.

Application filed April 20, 1885. (No model.)

*To all whom it may concern:*

Be it known that I, WILLIAM W. LEONARD, a citizen of the United States, residing at Springfield, in the county of Hampden and State of Massachusetts, have invented a new and useful Device for Preventing Runaways, of which the following is a specification.

My invention relates to mechanism combined with the axle and wheel of a vehicle, to be operated by the driver, to convert the rotation of the wheel to a pull, through a connecting-line, upon the mouth of the runaway animal; and it consists in the combination and construction, as hereinafter described, and more fully pointed out in the claim.

My invention is fully illustrated in the accompanying drawings, in which Figure I is a side elevation in partial section of my device combined with the front axle of a vehicle. Fig. II is a plan view of the same, and Fig. III is a rear elevation of the same.

B is the front axle of a vehicle. C is a wheel thereupon.

$c$ is a gear concentric with the axle and fixed upon the inner hub of wheel C.

D is a shaft, supported in bearings from axle B, and parallel thereto, when in operative position, as shown in Figs. II and III.

$b$ is a fixed bearing for one end of shaft D, and securely bolted to the axle, and $g$ is a bearing to shaft D, movable, to set the shaft parallel to axle B or removed therefrom at an angle. The bearing $g$ is upon the shorter end of a lever, G, fulcrumed at $h$ in a support, $m$, securely bolted to the axle, and the lever G is adapted to be swung upon its hinge $h$ to hold the shaft D raised or depressed by means of the stop H, forming part of the support $m$. The free end of lever G, in convenient reach of the driver, when brought to bear against one side of stop H, as seen in Fig. I, holds the end of shaft D nearer the wheel raised from its hub. When on the other side of stop H, as shown in Figs. II and III, the shaft D is held parallel to the axle B.

The stop H is preferably inclosed by a loop or guiding-surface, as shown in plan view, Fig. II, and sufficient play is allowed the lever G at its hinge $h$ to permit the lateral movement necessary.

Upon the end of shaft D, nearer wheel C, is fixed a gear $d$, adapted to engage with the one $c$ when the shaft D is held parallel to the axle, as seen in Figs. II and III, and adapted to be withdrawn from such engagement to leave the one $c$ free when the shaft D is held as shown in Fig. I. The end of shaft D held in bearing $b$ is adapted to permit the slight swing of shaft D required.

In Fig. III a modification of this connection of the gears of Figs. I and II is shown in the friction-wheels $c'$ and $d'$, no other change in the rest of the mechanism, except a slight play being allowed to lever G upon one side of stop H, to permit the amount of friction between the surfaces of pulleys $d'$ and $c'$ to be regulated by the pressure of the hand, being required.

When an animal commences to run, the mechanism from its inoperative position in Fig. I is brought to throw the whole momentum of the moving vehicle in a backward pull upon his mouth by simply changing the position of the lever G to the other side of stop H.

In cases where the gearing $c$ $d$ is employed, the backward pull is generally sufficient to "throw" a horse. In cases where the welfare of the animal is paramount the friction-pulleys $c'$ and $d'$ are preferable, as the force of the pull may be diminished and extended over a longer time.

Upon the shaft D the cord-pulley I is fixed, and the cord $i$, secured to the pulley, commences to be wound synchronously with the rotation of shaft D. The cord $i$ is preferably composed of twisted wire, and is carried in any convenient way to one horse's mouth or to those of both of a double team.

In the drawings a coil spring is represented as taking the place of a horse's mouth.

I am aware that a gear on the wheel and a counter-shaft on the axle, with a cord atttachment for stopping the horse, have been described for a similar purpose. I claim only my own construction.

Now, having described my invention, what I claim is—

In combination with the axle of a vehicle, a wheel provided with a friction-gear, a shaft on the axle having a corresponding friction-gear, and a line leading forward from the shaft for attachment to the animal, a shifting lever fulcrumed on a projection from the axle and having a bearing for the shaft, so that the friction-gear may be thrown into or out of contact by means of the lever, and a stop by which the lever is held, all substantially as described.

WILLIAM W. LEONARD.

Witnesses:
R. F. HYDE,
FRANCIS LEYDEN.